April 6, 1937.   J. O. ALMEN   2,076,057
RACE AND ROLLER TRANSMISSION MECHANISM
Filed June 18, 1936   2 Sheets-Sheet 1

Inventor
John O. Almen
By Blackmore, Spencer & Flint
Attorneys

April 6, 1937. J. O. ALMEN 2,076,057
RACE AND ROLLER TRANSMISSION MECHANISM
Filed June 18, 1936 2 Sheets-Sheet 2

Inventor
John O. Almen

Patented Apr. 6, 1937

2,076,057

UNITED STATES PATENT OFFICE 2,076,057

RACE AND ROLLER TRANSMISSION MECHANISM

John O. Almen, Royal Oak, Mich., assignor to General Motors Corporation, Detroit, Mich., a corporation of Delaware Application June 18, 1936, Serial No. 85,832

10 Claims. (Cl. 74—208)

This invention relates to power transmission mechanism comprising coaxial races and interposed rollers in tractive contact therewith, associated with means adapted to apply an axial force to the races for maintaining the races and rollers in adequate tractive contact, and to vary the magnitude of this force automatically in accordance with torque requirements.

Objects of the invention are to apply an axial force to the races tending to squeeze the races and rollers together in response to the sum of the tangential forces exerted by both driving and driven races; to relieve the transmission frame and housing of strains due to the action of the squeezing means, and to simplify and otherwise improve transmission mechanisms of this type.

The invention consists in the combination of coaxial power transmitting races and interposed rollers, with a torque loading means acting and reacting between the races to draw them toward each other, and responding to the sum of the tangential forces developed between races and rollers for squeezing the rollers between the races.

In the accompanying drawings in which like reference characters indicate like parts in the several views.

Figure 1:
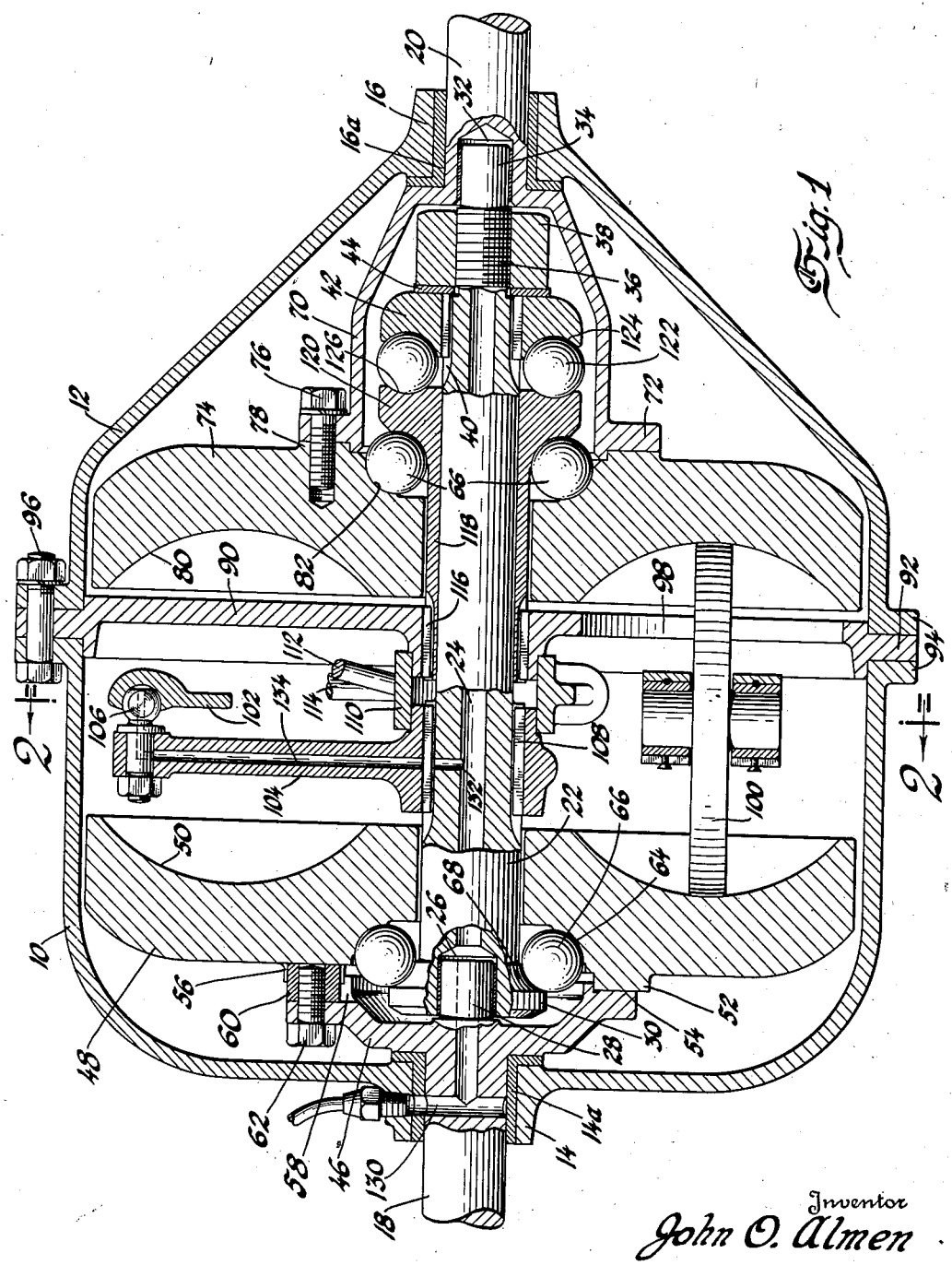
Figure 1 is a sectional view taken substantially on the plane indicated by the section line 1—1 of Figure 2.
Figure 2:
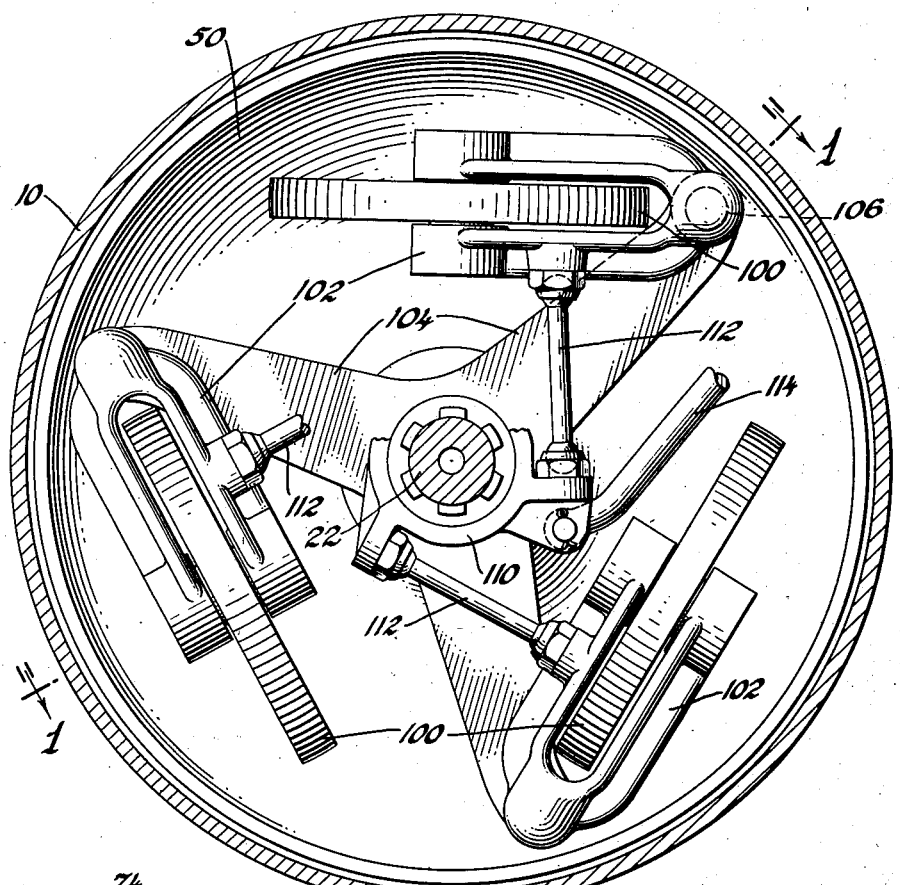
Figure 2 is a transverse section taken substantially on the line 2—2 of Figure 1, certain interior parts having been broken away.

In the drawings numeral 10 indicates one part of a two part housing, and numeral 12 the other part of said housing. Part 10 includes a perforated bearing boss 14 and part 12 a corresponding perforated bearing boss 16 axially aligned with the boss 14. A bearing bushing 14a is disposed within the bearing boss 14 and a bearing bushing 16a is disposed within the bearing boss 16. A shaft 18, which may be considered the power input shaft, is journalled in the bearing bushing 14a and an aligned shaft 20, which may be considered as the output shaft, is journalled in the bearing bushing 16a. However, the apparatus may operate with the shaft 20 as the input and the shaft 18 as the output shaft.

Coaxial with the shafts 18 and 20 and having a spiggot or pilot bearing connection with each is a non-power transmitting shaft 22, preferably perforated from end to end, as indicated at 24. That end of shaft 22 which is adjacent shaft 18 is counterbored as at 26 to receive a reduced pilot end 28 on shaft 18, there being a suitable bearing bushing interposed between the wall of the counterbore 26 and the exterior of the pilot end 28. The end of shaft 22 which is counterbored at 26 has rigidly united thereto and preferably integrally formed therewith a thrust bearing member 30.

The other end of shaft 22 enters a counterbore 32 in shaft 20 in which is seated a reduced pilot end 34 of the shaft 22, and between the wall of the counterbore 32 and the pilot end 34 there is seated a suitable bearing bushing as shown. This latter mentioned end of shaft 22 is threaded as indicated at 36 to receive a nut 38. Adjacent the nut, shaft 22 is splined or provided with lands or grooves as indicated at 40, which cooperate with an abutment ring 42 axially adjustable thereon. Between the abutment ring 42 and the nut 38 there is preferably disposed a washer 44. Rotating the nut in the proper sense will therefore adjust the abutment ring 42 to the left with respect to shaft 22, as shown in Figure 1, or permit it to be adjusted to the right, as shown in said figure, the allowable movement in either case being slight but ample for the purpose. The abutment 42 constitutes one element of the torque loading means previously mentioned, which will be described presently.

The assumed driving shaft 18 is provided within the housing part 10 with a shallow-dished relatively large flange 46 having a driving connection with the back of a power transmitting race 48, the face of which is formed with a toroidal raceway 50. The flange 46 may be coupled to the race 48 in any convenient manner. As shown in Figure 1 the back of race 48 is formed with a circular rib 52 which is interrupted at intervals with radial notches 56, the flange 46 being jointed to the rib 52, as indicated at 54, except at the notches 56. The flange 46 is provided with notches 58 corresponding to the notches 56 in the flange 52. Blocks 60 adapted to fit within the notches 56 and 58 are secured by bolts 62 to the flange 46. This construction forms a positive driving connection between the shaft 18 and the race 48.

The back of race 48 is grooved, as shown at 64, to form a raceway to receive bearing balls 66 disposed therebetween and a cooperating raceway or groove 68 in the thrust bearing member 30. Race 48 therefore is free to rotate relatively to shaft 22 on the described ball bearing.

The assumed output shaft 20 has rigidly united to its end within the housing part 12 a bellshaped coupling member 70 flanged as at 72 and rigidly connected to power transmitting race 74 by any suitable means such as bolts 76 which pass through flange 72 and into a rib 78 formed integral with the back of the race 74. The face of race 74 is formed with a toroidal raceway 80 corresponding to and facing the raceway 50 of the race 48. The back of race 74 is also formed with a groove 82 constituting a ball raceway or groove corresponding to the groove 64 in the race 48.

Bolted to the two parts 10 and 12 of the housing at their junction is a transverse torque resisting frame member 90 having a flange 92 seated between flanges 94 on the adjacent ends of housing parts 10 and 12. Bolts 96 pass through said flanges 92 and 94, securing the two portions 10 and 12 of the housing and the frame member 90 together. The frame member 90 is shown provided with openings 98 to permit rollers 100 to be mounted between the races 48 and 74 in order to convert the rotation of one race into rotation of the other but in the opposite sense.

The said rollers 100 are supported in forked carriers 102 universally jointed as shown at 106 to the arms 104 of a spider which is non-rotatively connected by splines as indicated at 108 to the described shaft 22 so that any angular movement of the spider must be transmitted to said shaft 22.

The transmission illustrated is of infinitely variable ratio within the limits permitted by the design. Any suitable means may be utilized for controlling the ratio of the rollers. There is shown, however, for this purpose, a ratio control collar 110 which is link-connected by universal joints with each roller carrier 102, said links being indicated in the drawing by numeral 112. The collar 110 may be mounted in any suitable manner coaxial with shaft 22. Adjusting movement is imparted to the control collar 110 from the exterior by any suitable means through the master control link 114. As the ratio control is no part of this invention, further description thereof is unnecessary. The type of control illustrated here is similar to that disclosed in P. N. 2,014,928, dated September 17, 1935.

The transverse torque resisting frame member 90 is connected by ribs and grooves as indicated at 116 with a central, axially movable sleeve-like frame member 118 surrounding shaft 22 within race 74. Sleeve-like frame member 118 is formed with a rigid thrust bearing member 120 formed with a ball raceway or groove opposed to the raceway or groove 82 in the race 74. Bearing balls 66 are interposed between these raceways and serve as antifriction bearings for the race 74.

From this construction it will be apparent that if the frame member 118 be moved to the left as shown in Figure 1, and the shaft 22 be moved to the right as shown in said figure, that the races 48 and 74 will be caused to approach one another and squeeze the rollers 100 between them. This relative movement is free to occur without changing the position of the spider, which supports the roller carriers, and the frame member 90 because the spider is splined to the shaft 22 and the frame member 118 is splined to frame member 90 so as to allow relative axial movement.

Figure 3:
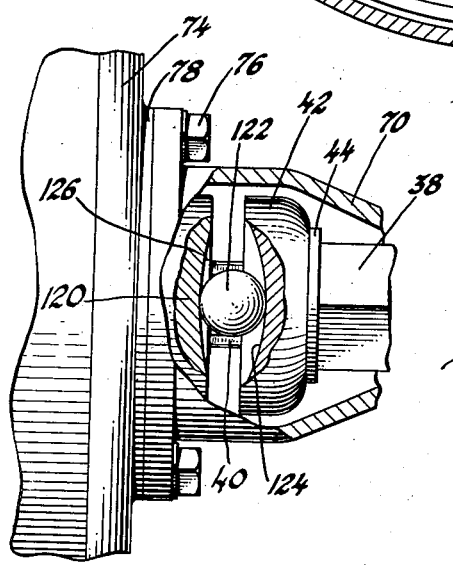
Figure 3 is a view partly in section disclosing the cams and balls of the torque loading means.

Between the torque loading abutment 42 and the thrust bearing member 120 are interposed means for converting rotative movement of abutment 42 into axial movement of member 118 and attached thrust bearing member 120, such as balls 122 which are seated in oppositely curved cam grooves in said abutment 42 and thrust bearing member 120, as clearly illustrated in Figure 3. The cam groove in abutment 42 is indicated in Figure 3 by the numeral 124, and the cooperating groove in the back of member 120 is indicated by the numeral 126.

It will now be apparent that if torque is applied to the shaft 22 of sufficient magnitude to impart to said shaft angular movement about its axis and with it the torque loading abutment 42, the latter will be rotatively displaced with respect to the ball race 120 and will therefore bring the opposite points of contact of the balls 122 into shallower portions of the cam grooves 124 and 126, thus tending to force the frame member 118 leftward and the shaft 22 correspondingly rightward. The effect of this action and reaction due to the rotation of the shaft 22 is to force the races toward each other and squeeze more tightly the rollers disposed between them.

The torque necessary to accomplish this action is applied to the spider arms 104 by the tractive forces exerted between both races 74 and 48 and rollers 100 in the same sense of direction.

This torque produces a push on the race 74 and a pull on the race 50 so that all the forces are expended between the operative units of the transmission and are not transmitted in any way to the frame or housing to distort them.

As the housing is not subjected to the axial forces applied by the torque loading means, the transmission may be completely assembled and adjusted outside of the housing and thereafter encased in the housing as a unit ready to be operated. It will be perceived upon inspection that after removing bolts 96, the housing part 12 may be drawn off over the shaft 20, or the part 10 drawn off over shaft 18, and then the entire working assembly together with frame member 90 may be removed from the other housing part; or that both housing parts may be slipped endwise over shafts 18 and 20.

Lubricating oil may be pumped under pressure into the oil receiving orifice 130 through the hollow boss 14 and bushing 14a, and thence through ducts in shaft 18 into the central passage 24 of shaft 22 whence it may be distributed to the spigot bearings at each end of said shaft and be forced through the side ports 132 into ducts 134 in the spider arms 104, and thence into the moving points and by passages not shown through the carriers 102 to the bearings of the rollers 100 as illustrated in said prior Patent No. 2,014,928.

I claim:

1. In a race and roller power transmission mechanism, a non-power-transmitting shaft, coaxial races rotatable about said shaft, intermediate rollers, supporting means for the rollers and means for connecting said roller supporting means to the shaft to receive the reaction of the tangential forces acting upon the rollers, a thrust bearing axially fixed on the shaft and engaging the back of one race, a non-rotatable axially movable thrust bearing surrounding said shaft, free from connection therewith, and engaging the back of the other race, a torque loading abutment fixed to said shaft against relative rotative movement and against axial movement thereon away from said axially movable thrust bearing, and means for converting angular movement of said shaft and abutment about their axes into an axial movement of said thrust bearing.

2. A mechanism as defined in claim 1 in which the roller supporting means is capable of relative axial movement but incapable of angular movement with respect to the shaft to which it is connected.

3. A mechanism as defined in claim 1 in which the axially movable thrust bearing is slidably but non-rotatably engaged with a transverse frame member disposed between the races.

4. A mechanism as defined in claim 1 in which the means for converting angular movement of the shaft and torque loading abutment about their axes into an axial movement of the axially movable thrust bearings consists of cam grooves in said abutment and thrust bearing and balls engaging in said grooves.

5. A mechanism as defined in claim 1 in which the thrust bearings include rolling bodies.

6. The power transmitting mechanism defined in claim 1, in combination with power input and power output shafts axially alined with said non-power-transmitting shaft, which is disposed between said power shafts, and flanged couplings between said power input and power output shafts and the backs of the respective races.

7. The power transmitting mechanism defined in claim 1, in combination with power input and power output shafts having flanged hollow couplings connecting them to the backs of races and housing the thrust bearings.

8. The power transmitting mechanism defined in claim 1, in combination with power input and power output shafts having flanged hollow couplings connecting them to the backs of the races, said hollow coupling between one of said shafts and races housing the thrust bearing for that race and the torque loading means.

9. In a race and roller power transmitting mechanism, axially alined driving and driven races and interposed rollers, power input and power output means respectively associated with said races, roller supporting means comprising a torque receiving member provided with means for resisting separation of the races, and torque loading means arranged between said torque receiving member and the back of one of said races, operative in response to the torque applied to said torque receiving member to squeeze the rollers between said races.

10. In a race and roller power transmitting mechanism, axially alined races and intermediate rollers, roller supporting means comprising a torque receiving member coaxial with the races, a nonrotatable thrust bearing at the back of and coaxial with one of said races, said thrust bearing being capable of axial movement with respect to the torque receiving member, means on said torque receiving member arranged to resist axial separation of said races, and means for converting angular movement of said torque receiving member into a relative axial movement of said thrust bearing and torque receiving member tending to squeeze the rollers between said races.

JOHN O. ALMEN.